United States Patent [19]
Knez

[11] Patent Number: 5,105,608
[45] Date of Patent: Apr. 21, 1992

[54] DRIVE APPARATUS FOR PROPELLING IMPLEMENTS

[76] Inventor: Jordan Knez, Skallebackavägen 11, 302 41 Halmstad, Sweden

[21] Appl. No.: 561,866

[22] Filed: Aug. 2, 1990

[30] Foreign Application Priority Data

Aug. 17, 1989 [SE] Sweden .................. 8902762

[51] Int. Cl.⁵ .................. A01D 34/44; A01D 51/00
[52] U.S. Cl. .................. 56/7; 56/328.1
[58] Field of Search .................. 56/6, 7, 14.7, 15.8, 56/16.2, 327.1, 328.1; 414/435, 437; 172/297, 459

[56] References Cited

U.S. PATENT DOCUMENTS

| | | | |
|---|---|---|---|
| 1,614,333 | 1/1927 | Worthington | 56/7 |
| 1,771,931 | 7/1930 | Kinney | 56/7 |
| 2,099,902 | 11/1937 | Moyer et al. | 56/7 |
| 2,996,867 | 8/1961 | Williams | 56/7 |
| 3,823,838 | 7/1974 | Gustafson et al. | 56/328.1 X |
| 4,478,026 | 10/1984 | Mullet et al. | 56/7 |
| 4,688,375 | 8/1987 | Mattson | 56/7 |

Primary Examiner—David J. Bagnell
Attorney, Agent, or Firm—Antonelli, Terry, Stout & Kraus

[57] ABSTRACT

An apparatus for displacement or advancement of implements such as, for example, ball collectors or harvesters, lawn mowers, etc., wherein a forward beam is provided with at least two spaced pivotal wheels and coupling arrangement for coupling a plurality of implements. The forward beam is connected to a frame provided with at least one steerable drive wheel spaced at a sufficient distance from the beam so that the plurality of implements are provided with sufficient clearance between the frame and the steerable drive wheel.

17 Claims, 2 Drawing Sheets

DRIVE APPARATUS FOR PROPELLING IMPLEMENTS

FIELD OF THE INVENTION

The present invention relates to an apparatus for displacement or advancement of implements such as, for example, ball collectors or ball harvesters, lawnmowers, etc.

BACKGROUND OF THE INVENTION

In many contexts, it is desirable to be able to displace or advance various types of implements and, at the same time, to be able to steer and turn the implements in small spaces and with small turning radii. However, prior art apparatuses for this purpose suffer from many drawbacks which limit their applicability. The prior art apparatuses are often of extremely complicated design and construction, which entails high manufacturing costs and high running and maintenance costs. Moreover, because of their complicated nature, prior art apparatuses suffer from a certain degree of unreliability. A further express wish in this art is that the total vehicle, including the apparatus for displacement or advancement in combination with the implement or implements, must be readily adaptable to the substrate or ground over which it is driven and, as it were, absorb possible unevenness in the terrain without limiting the efficiency or terrain index of the implement or implements.

SUMMARY OF THE INVENTION

The object of the present invention resides in avoiding or at least reducing the drawbacks inherent in prior art apparatuses of the type contemplated herein and to satisfy the established desiderata.

According to the present invention, an apparatus of the aforementioned type includes a forward beam provided with at least two pivotal wheels disposed in spaced-apart relationship, and with coupling means for coupling of a plurality of implements wherein the beam is connected to a frame provided with at least one steerable drive wheel spaced at such a distance from the beam so that the plurality of implements will have room between the frame and the steerable drive wheel, and wherein the beam extends freely over the plurality of implements. The beam is pivotally connected to the frame in such a manner that the beam and the frame are pivotal relative to one another about a horizontal axis. The pivotal wheels on the beam are freely rotatable, in the manner of castors or swivels. The drive wheel is journalled in a generally U-shaped bracket which is pivotal in the frame. The drive wheel is connected to a hydraulic motor. The hydraulic motor is placed in the hub of the drive wheel. The drive wheel is of considerably larger diameter than the pivotal wheels on the beam, whereby the frame slopes in a direction from the drive wheel towards the frame. A seat and a steering arrangement are disposed on the frame. The steering arrangement is disposed, by turning of a steering wheel in one direction in which the plurality or a cluster of the implements to be displaced or advanced, to realize a drive wheel response throw in the opposite direction.

The present invention realizes a displacement or advancement apparatus of an extremely simple and uncomplicated design and construction which, moreover, will permit advancement or displacement of implements disposed thereon in a highly efficient and gentle manner. Since the advancement force and requisite pivotal force act in substantially the same direction, a very small turning radius will be achieved and, above all, relatively slight forces will act on the implements and the various parts of the apparatus. To a considerable extent, this feature makes possible the simple design and construction of the apparatus. Since the implement or implements may be placed between the forward support wheels and the rear drive wheel, the peripheral speed of the implement or implements will be greatly reduced in different turning radii, which is often of considerable advantage for the function of the implement or implements and gives improved operational results.

The nature of the present invention and its aspects will be more readily understood from the following brief description of the accompanying drawings.

DETAILED DESCRIPTION

Figure 1:
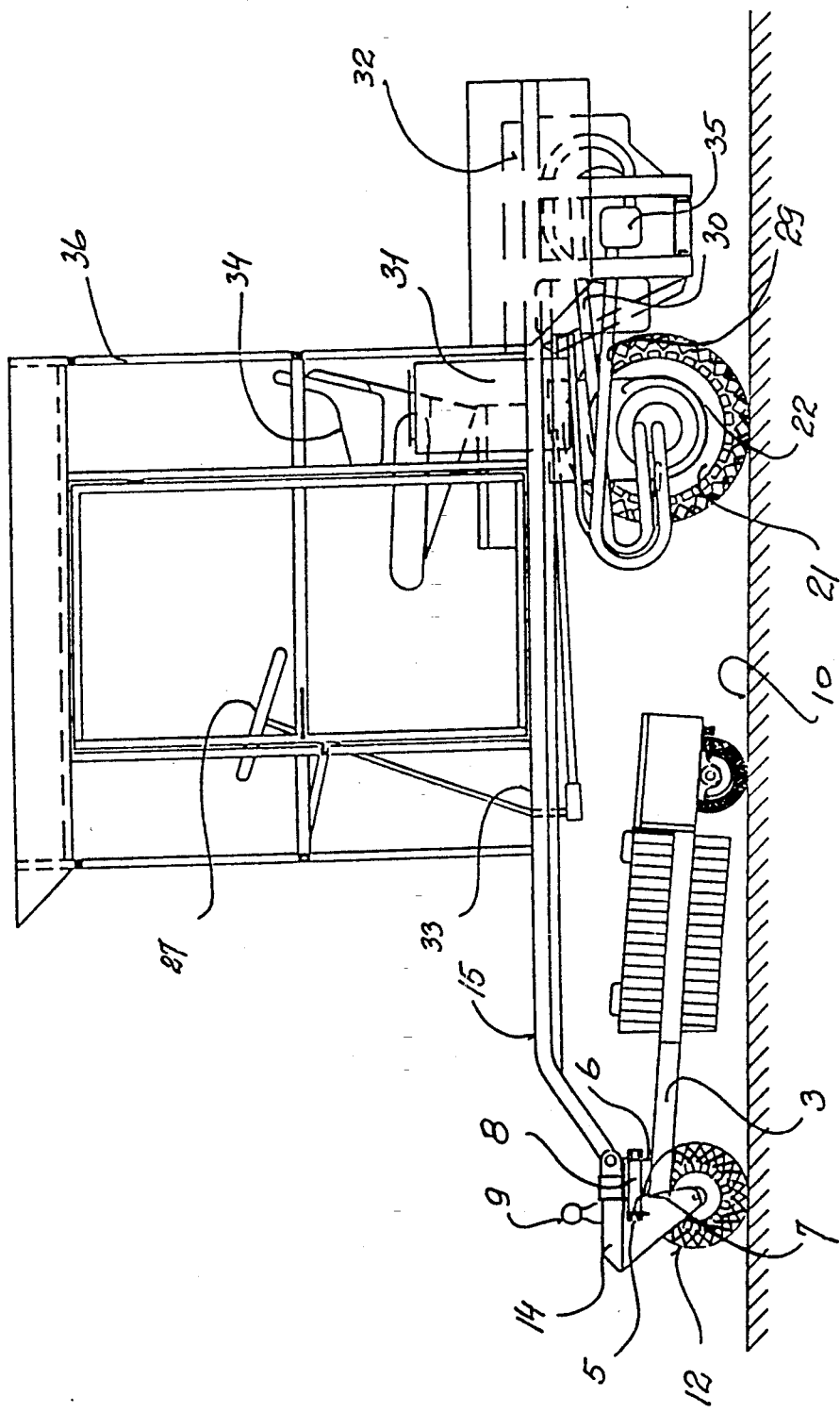
FIG. 1 is a schematic side elevation of one embodiment of the apparatus according to the present invention.

The illustrated embodiment of the present invention will be described in connection with employment of the apparatus for displacement or advancement of a number plurality or a cluster of golf ball harvesters 1, 2, 3 of conventional design. The harvesters 1, 2 and 3 are coupled to a beam 4 by a bolt 5 which extends through lugs 6 and 7 protruding from the beam 4, and a sleeve 8 which is fixedly welded on the forward portion of the harvesters 1, 2 and 3. The bolt 5 runs freely through the sleeve 8, whereby the harvesters 1-3 will be pivotal about the bolt 5. The harvesters 1 and 3 are pivotally secured to the beam 4 at the ends thereof, while the harvester 2 is secured centrally on the beam 4. A drawbar 9 is also disposed centrally on the beam 4 and may be utilized for other types of implements or for towing the apparatus.

The beam 4 is supported on a substrate 10 by two spaced-apart wheels 11 and 12. The wheels 11 and 12 are advantageously of the castor or swivel type which are secured on mounting brackets or plates 13 and 14 projecting forwardly from the beam 4.

The beam 4 is interconnected with a frame 15 by two bolts 16 and 17 extending in parallel the frame 4, these bolts extending through lugs which are secured on the beam 4 and the leading ends of the frame 15. Thus, the beam 4 and the frame 15 are pivotal relative to one another about a horizontal axis. The frame 15 is provided with a forward cross strut 18 and a substantially centrally disposed carrier plate 19 extending from the cross strut 18 to the rear portion of the frame 15. The frame 15 includes a further cross strut 20 for rigidifying and stabilizing the frame 15 and for carrying various details and fittings. If desired, the frame 15, the cross struts 18 and 20 and the carrier plate 19 may be wholly or partly covered by a grating plate (not shown).

Figure 2:
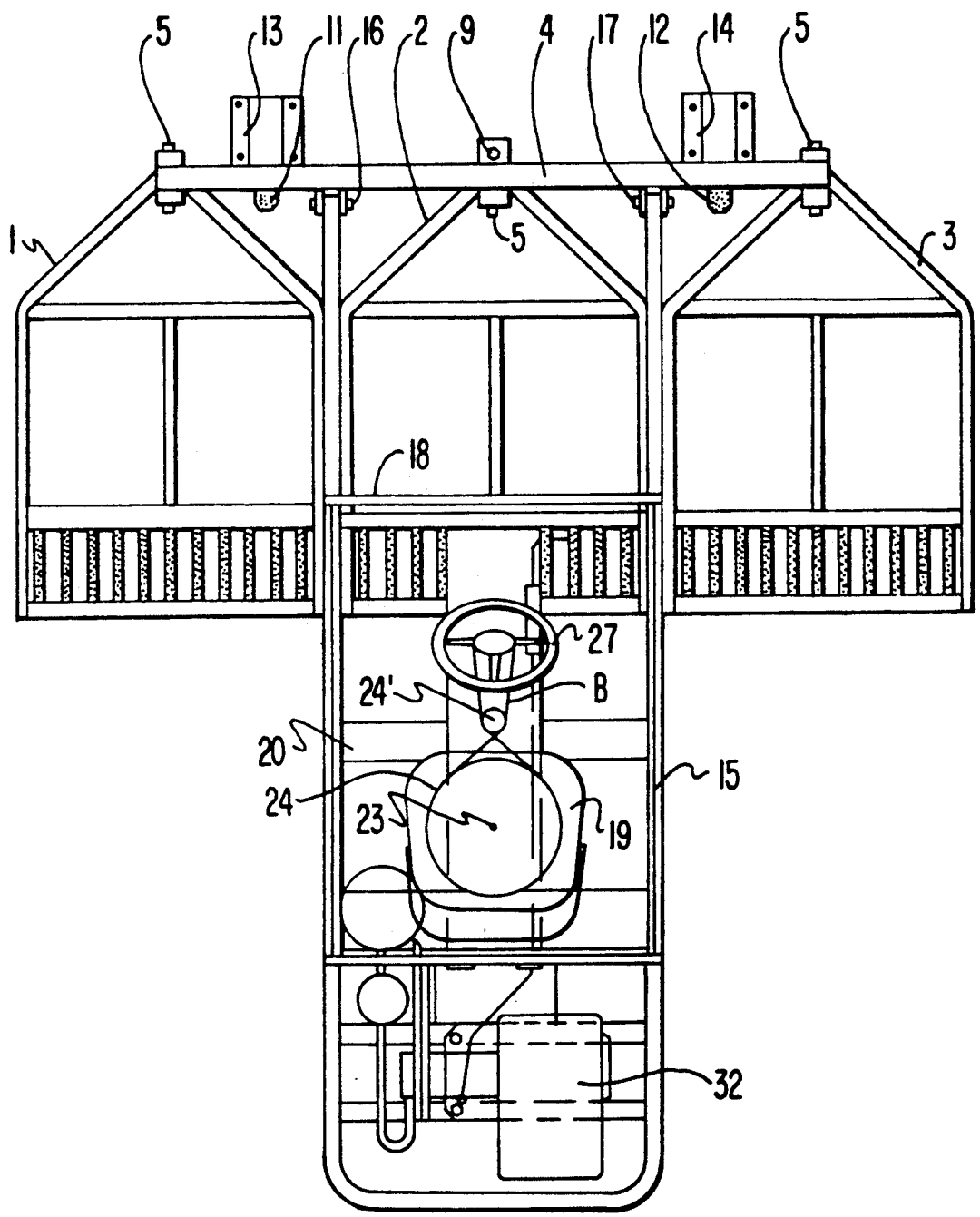
FIG. 2 is a top plan view of the embodiment of FIG. 1.

A drive wheel 21 is pivotally or rotatably disposed at the rear portion of the frame 15. The drive wheel 21 is journalled in a substantially U-shaped bracket 22 whose bottom shank is provided with a shaft 23 which pivotally extends through the plate 19 and, on the opposing side of the plate 19, carries a wheel 24. The shaft 23 is ideally journalled in the plate 19 in some suitable manner. The bracket 22 and the drive wheel 21 are thus pivotal in the frame 15 about the shaft 23, with the aid of the wheel 24. The wheel 24 is included in a steering arrangement which, in the present embodiment, includes a drive chain or drive belt B which, via the guide wheel 24, extends to a wheel 21 turnable by a steering wheel 27. Since the drive chain or drive belt B is cross-laid between the wheels 24, 24' and and steering wheel 27, the drive wheel 21 will be caused to turn in a direction opposite to the direction in which the steering wheel 27 is turned, whereby the beam 4 and the harvesters 1-3 will be turned in the same direction as the direction of turning of the steering wheel. Naturally, the steering arrangement need not, as in this case, be mechanical but could just as well be hydraulic or operative in any other manner as intimated in FIGS. 1 and 2.

Ideally, the drive wheel 21 is provided, in its hub, with a known hydraulic motor which, via hoses 29 and 30 and a three-way valve 35, is connected to a known hydraulic pump via a hydraulic tank 31. The hydraulic pump is driven by a suitable type of motor which, in the present embodiment, is illustrated in the form of an internal combustion engine 32. A seat 34 is further provided in FIG. 1 the frame 15 and possibly also a cab intimated by broken lines. Furthermore, other protective plating and hoods may be provided as intimated by broken lines. A pedal 33 is further provided on the frame for switching the valve 35 between its neutral position, forward position and reverse position, and corresponding driving of the hydraulic motor in the drive wheel 21. In addition, a suitable brake device may be provided if desired, this being optionally hand-operated or foot-operated by a pedal.

The apparatus and arrangements described in the foregoing are, naturally, not restricted to the displacement or advancement of the illustrated golf ball harvesters 1-3, but may of course be employed, without any major modifications, for advancement or displacement of. for instance, cylinder lawnmowers or the like. By lengthening the beam 4, this beam may be rendered capable of accepting five such harvesters or even more. In addition, the frame 15 may be superstructured by a cab 36.

The present invention should not be considered as restricted to that described above and shown in the drawings and many modifications being conceivable without departing from the spirit and scope of the inventive concept as encompassed by the appended claims.

I claim:

1. An apparatus for propelling a plurality of implements comprising a beam provided at a forward end of the apparatus, a frame extending freely over the plurality of implements, at least two pivotably mounted wheels provided on said beam at a predetermined distance from each other, coupling means for coupling the plurality of implements to the beam, at least one steerable drive wheel provided on the frame, and means for connecting said beam to the frame at a position so as to provide a sufficient space between the frame, the beam and the at least one steerable drive wheel to accommodate said plurality of implements between said pivotably mounted wheels and said at least one steerable drive wheel.

2. The apparatus as claimed in claim 1, wherein the pivotably mounted wheels are freely rotatable and include castors.

3. The apparatus as claimed in one of claims 1 or 2, wherein the plurality of implements include one of a ball collector, harvester, and lawnmower.

4. The apparatus as claimed in claim 1, wherein the at least one steerable drive wheel has a larger diameter than a diameter of the wheels provided on the beam, and wherein the frame slopes in a direction from the drive wheel toward the beam.

5. The apparatus as claimed in claim 4, further comprising a seat and a steering arrangement disposed on the frame.

6. The apparatus as claimed in claim 5, wherein the steering arrangement is constructed such that by turning a steering wheel of the steering arrangement in a direction in which the plurality of implements are to be displaced a response of the at least one steerable drive wheel occurs in an opposite direction.

7. An apparatus for displacement or advancement of implements, the apparatus comprising a forward beam pivotally connected with a frame of the apparatus such that the forward beam and the frame are pivotal relative to one another about a horizontal axis, at least two spaced-apart pivotal wheels provided on said forward beam, and coupling means for coupling the plurality of implements, wherein the beam is connected to the frame which is provided with at least one steerable drive wheel spaced at such a distance from the beam that the plurality of implements have room between the frame and the steerable drive wheel, and wherein the frame extends freely over the plurality of implements.

8. An apparatus for displacement or advancement of implements, the apparatus comprising a forward beam provided with at least two spaced-apart pivotal wheels, and coupling means for coupling the plurality of implements, wherein the forward beam is connected to the frame provided with at least one steerable drive wheel journaled in a generally U-shaped bracket pivotal in the frame, said at least one steerable drive wheel being spaced at such a distance from the beam that the plurality of implements have room between the frame and the at least one steerable wheel, and wherein the frame extends freely over the plurality of implements.

9. The apparatus as claimed in claim 8, wherein the at least one steerable drive wheel is connected to a hydraulic motor.

10. The apparatus as claimed in claim 9, wherein the hydraulic motor is disposed in a hub of the at least one steerable drive wheel.

11. The apparatus as claimed in one of claims 7, 8, 9, or 10, wherein the plurality of implements include one of a ball collector, harvester, and lawnmower.

12. An apparatus for propelling a plurality of implements comprising a beam provided at a forward end of the apparatus, a frame extending freely over the plurality of implements, at least two pivotably mounted freely rotatable wheels including casters provided on said beam at a predetermined distance from each other, coupling means for coupling the plurality of implements to the beam, at least one steerable drive wheel provided on the frame, and means for connecting said beam to said frame at a position so as to provide a sufficient space between the frame, the beam and the at least one steerable drive wheel to accommodate said plurality of implements, wherein the at least one steerable drive wheel has a larger diameter than a diameter of the wheels provided on the beam, and wherein the frame slopes in a direction from the drive wheel toward the beam.

13. The apparatus as claimed in claim 12, further comprising a seat and a steering arrangement disposed on the frame.

14. The apparatus as claimed in claim 13, wherein the steering arrangement is constructed such that by turning the steering wheel of the steering arrangement in a direction in which the plurality of implements are to be displaced a response of the at least one steerable drive wheel occurs in an opposite direction.

15. An apparatus for displacement or advancement of implements, the apparatus comprising a forward beam pivotally connected with a frame of the apparatus such that the forward beam and the frame are pivotal relative to one another about a horizontal axis, at least two spaced-apart pivotal wheels provided on said forward beam and coupling means for coupling the plurality of implements, wherein the beam is connected to the frame which is provided with at least one steerable drive wheel spaced at such a distance from the beam that the plurality of implements have room between the frame and the steerable drive wheel, the frame extends freely over the plurality of implements the at least one steerable drive wheel has a larger diameter than a diameter of the wheels provided on the beam, and wherein the frame slopes in a direction from the drive wheel toward the beam.

16. The apparatus as claimed in claim 15, further comprising a seat and a steering arrangement disposed on the frame.

17. The apparatus as claimed in claim 16, wherein the steering arrangement is constructed such that by turning the steering wheel of the steering arrangement in a direction in which the plurality of implements are to be displaced a response of the at least one steerable drive wheel occurs in an opposite direction.

* * * * *